(12) United States Patent
Piazza

(10) Patent No.: US 6,968,220 B2
(45) Date of Patent: Nov. 22, 2005

(54) RF RECEIVER WITH POWER OFF CONTROL

(75) Inventor: Francesco Piazza, Bioggio (CH)

(73) Assignee: Nemerix SA, Manno (CH)

( * ) Notice: Subject to any disclaimer, the term of this patent is extended or adjusted under 35 U.S.C. 154(b) by 642 days.

(21) Appl. No.: 09/973,593

(22) Filed: Oct. 9, 2001

(65) Prior Publication Data

US 2002/0077074 A1 Jun. 20, 2002

(30) Foreign Application Priority Data

Oct. 10, 2000 (EP) .............................. 00810933

(51) Int. Cl.[7] .............................................. H04B 1/00
(52) U.S. Cl. ................... 455/574; 455/522; 455/550.1
(58) Field of Search ........................... 455/131, 169.1, 455/196.1, 200.1, 208, 180.3, 260, 13.4, 73, 76, 574, 522, 550.1

(56) References Cited

U.S. PATENT DOCUMENTS

| 4,011,514 | A | * | 3/1977 | Wroblewski | 455/169.2 |
|---|---|---|---|---|---|
| 4,340,973 | A | * | 7/1982 | Umetsu | 455/228 |
| 4,380,832 | A | | 4/1983 | Nagata et al. | 455/343 |
| 4,511,923 | A | * | 4/1985 | Gotz | 348/733 |
| 4,590,611 | A | * | 5/1986 | Maier et al. | 455/166.1 |
| 4,631,737 | A | | 12/1986 | Davis et al. | 375/88 |
| 4,866,261 | A | | 9/1989 | Pace | 341/138 |
| 4,893,094 | A | * | 1/1990 | Herold et al. | 331/1 A |
| 4,929,851 | A | | 5/1990 | Pace | 307/359 |
| 4,956,711 | A | * | 9/1990 | Maier | 348/733 |
| 5,128,632 | A | * | 7/1992 | Erhart et al. | 331/1 A |
| 5,201,063 | A | * | 4/1993 | Tam et al. | 455/67.11 |
| 5,448,756 | A | * | 9/1995 | DeLuca et al. | 340/7.33 |
| 6,223,061 | B1 | * | 4/2001 | Dacus et al. | 455/574 |
| 6,463,050 | B1 | * | 10/2002 | Nagashima | 370/347 |
| 6,532,357 | B1 | * | 3/2003 | Ichikawa | 455/126 |
| 6,658,240 | B1 | * | 12/2003 | Ries | 455/183.1 |
| 6,697,436 | B1 | * | 2/2004 | Wright et al. | 375/296 |

* cited by examiner

Primary Examiner—Binh K. Tieu

(57) ABSTRACT

An RF receiver or another type of electronic circuit contains circuit elements a setting of which is controlled by at least one control voltage. Furthermore, a control unit is provided for switching off the circuit elements during power-off periods. While the circuit elements are switched off, the control voltage is stored in storage capacitors, which allows to start the circuit up quickly after a switch-off period.

23 Claims, 2 Drawing Sheets

RF RECEIVER WITH POWER OFF CONTROL

CROSS REFERENCE TO RELATED APPLICATIONS

This application claims the priority of European patent application 00810933.2, filed Oct. 10, 2000, the disclosure of which is incorporated herein by reference in its entirety.

BACKGROUND OF THE INVENTION

The invention relates to a radio frequency receiver according to the preamble of the independent claim.

It has been known to provide electronic circuits with power save or control units for switching the circuits off when they are not used. When switching the circuits off, it may be required or desirable that their settings are saved. E.g. when switching a TV off by a remote control, its current loudness settings should be preserved. For this purpose, a control voltage controlling the loudness is stored in a digital memory, from where it is fed to an D/A-converter when the device is switched back on. This, however, requires additional circuitry.

Furthermore, it has been know to preserve energy in radio frequency receivers by switching the receiver section on and off, in particular in receivers of digital data with a know time structure. In such receivers, the settings of the receiver section, e.g. the control voltage of a VCO in a PLL, are usually lost during power-off periods. When these components are switched back on, some time passes before the settings have been re-established.

BRIEF SUMMARY OF THE INVENTION

Hence, the problem to be solved by the present invention is to provide an RF receiver of the type mentioned above that maintains its settings while being switched off without requiring additional complicated circuitry.

Now, in order to implement these and still further objects of the invention, which will become more readily apparent as the description proceeds, the radio receiver is manifested by the features that it comprises circuit elements a setting of which is controlled by at least one control voltage, a control unit for switching off the circuit elements during power-off periods, and a storage for storing the control voltage while the circuit elements are switched off, wherein the storage comprises a storage capacitor storing the control voltage.

In a further aspect of the invention, the radio frequency receiver comprises a frequency downconverter for downconverting an incoming signal to an intermediate frequency, an oscillator circuit being connected to the downconverter, a frequency of said oscillator being controlled by a control voltage, a control unit for switching off the oscillator during power-off periods, and a capacitor for storing the control voltage while the oscillator is switched off.

To store the setting, the corresponding control voltage is stored in a storage capacitor. This obviates the need for providing a digital memory and a D/A-converter. Since the control voltage needs not be converted to digital information and back, circuitry remains simple and power consumption is reduced.

For a reliable storage of the control voltage, a discharge time of the capacitor during switch-off should be much larger than a typical switch-off time.

To increase storage time, an electronic switch can be provided for disconnecting the capacitor from at least part of the circuit elements while they are switched off. Alternatively or in addition to that, an active hold circuit can be used for maintaining the voltage over the capacitor.

The technology described here is particularly useful for RF receivers. When part of an RF receiver is switched off for reducing power consumption or during periods of high electronic noise from a radio transmitter in the same appliance, its settings can be maintained using capacitive storage.

In particular, RF receivers usually comprise downconverters, where the incoming signal is mixed to a reference frequency. The reference frequency is usually generated by a VCO in a PLL. If such a circuit is switched off and back on, it requires some time to regain stable reference frequency unless the voltage controlling the VCO is stored.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE INVENTION

Figure 1:
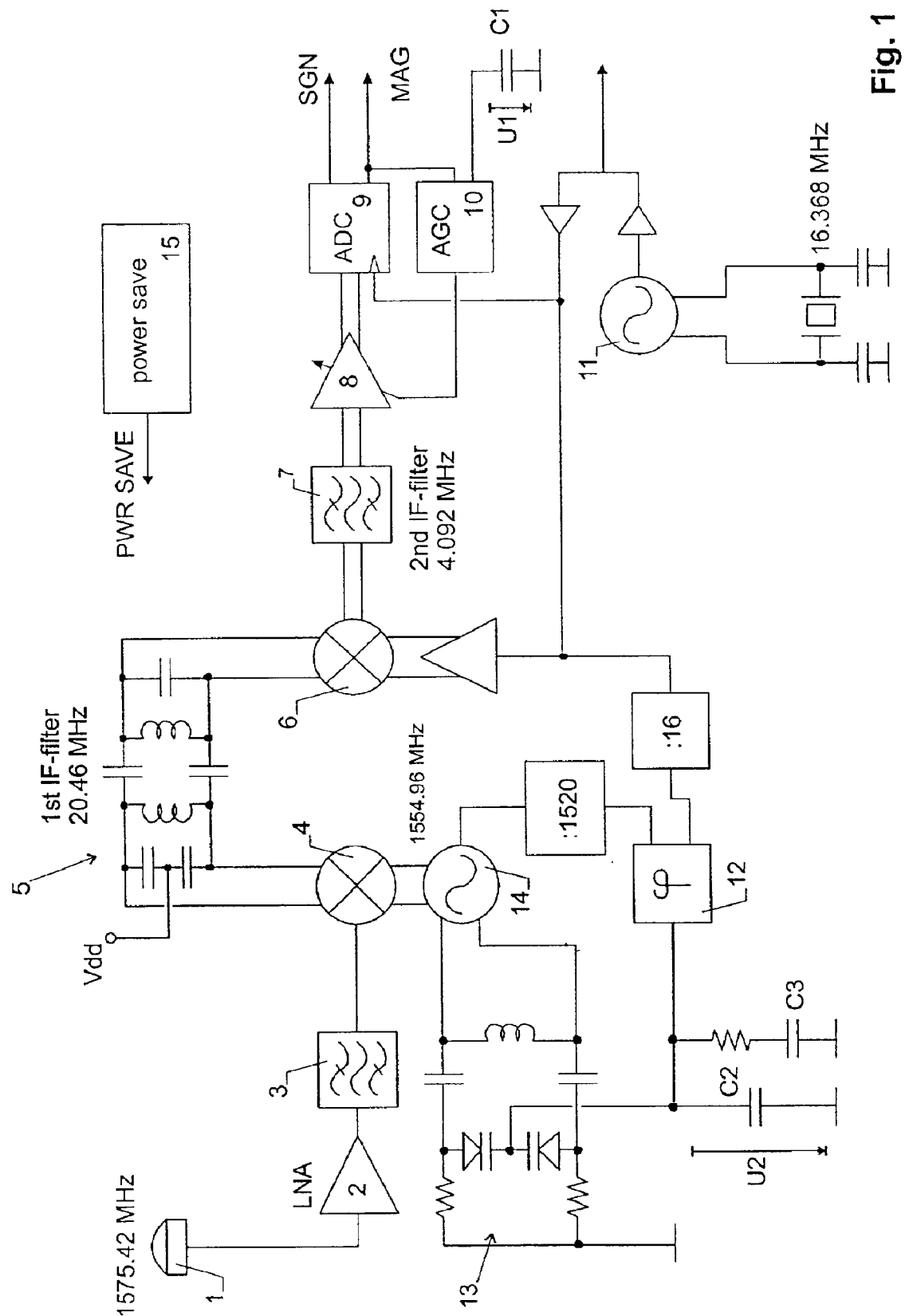
FIG. 1 shows a circuit diagram of an RF receiver.

A preferred embodiment of the invention is an RF-receiver shown in FIG. 1. The receiver shown here is used for receiving the signal of GPS satellites at 1575.42 MHz, but the same technique can be applied to other type of radio receivers, in particular for digital signals.

The receiver comprises an antenna 1 with low noise amplifier 2 and an input filter 3. The signal from input filter 3 is fed to a frequency mixer 4, which mixes the carrier at 1575.42 MHz with a frequency of 1554.96 MHz to generate a downconverted first IF signal at 20.46 MHz. The first IF signal is filtered in a first IF filter 5 and fed to a second mixer 6, where it is mixed with a frequency of 16.368 MHz to generate a second downconverted IF signal at 4.092 MHz. The second IF signal is fed through a second IF filter 7 and to a adjustable amplifier 8. The output of adjustable amplifier 9 is fed to an A/D-converter 9 which generates a digital value of two bits SGN and MAG giving the sign and magnitude of the signal. The magnitude bit is analyzed by an adjustable gain control (AGC) 10 to set the gain of adjustable amplifier 8.

Figure 2:
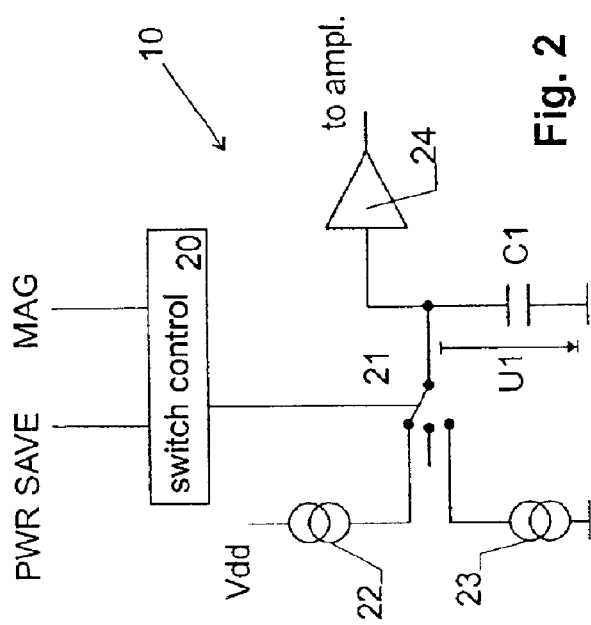
FIG. 2 part of the automatic gain control circuit.

The design of AGC 10 is shown in FIG. 2. It comprises a switch control unit 20 controlling a switch 21. In a first state, switch 21 connects a capacitor C1 via a current source 22 to the positive supply voltage Vdd. In a second state, switch 21 connects capacitor C1 via a current source 23 to the negative supply voltage or ground. In a thirds state, switch 23 is in high impedance state. The voltage U1 over C1 is fed as a control voltage to the high impedance input of a buffer 24, the output of which controls amplifier 8, wherein a lower voltage U1 corresponds to a higher amplification in amplifier 8.

In normal operation, if MAG is 1, switch 21 is in its first state and, if MAG is 0, switch 21 is in its second state, i.e. the voltage over capacitor C1 is proportional to the average value of MAG. If the average value of MAG is large, voltage U1 increases, thereby decreasing the amplification of adjustable amplifier 8 and vice versa. The gain loop is adjusted such that it tries to hold MAG at an average value of 0.33, thereby holding the average signal strength at a desired value.

The circuit of FIG. 1 further comprises a Quartz oscillator 11 operating at 16.368 MHz. It generates the reference frequency for second mixer 6. Furthermore, it provides a frequency base for a PLL. The PLL comprises a phase and frequency comparator 12 for comparing the Quartz oscillator frequency divided by 16 to the PLL's frequency divided by 1520. The output of comparator 12 is fed to a low pass filter comprising storage capacitors C2, C3, the voltage U2 over which is the control voltage for the resonance frequency of a tank circuit 13 of a VCO 14. By this arrangement, the VCO's frequency is kept at 1554.96 MHz, the reference frequency for first mixer 4.

Figure 3:
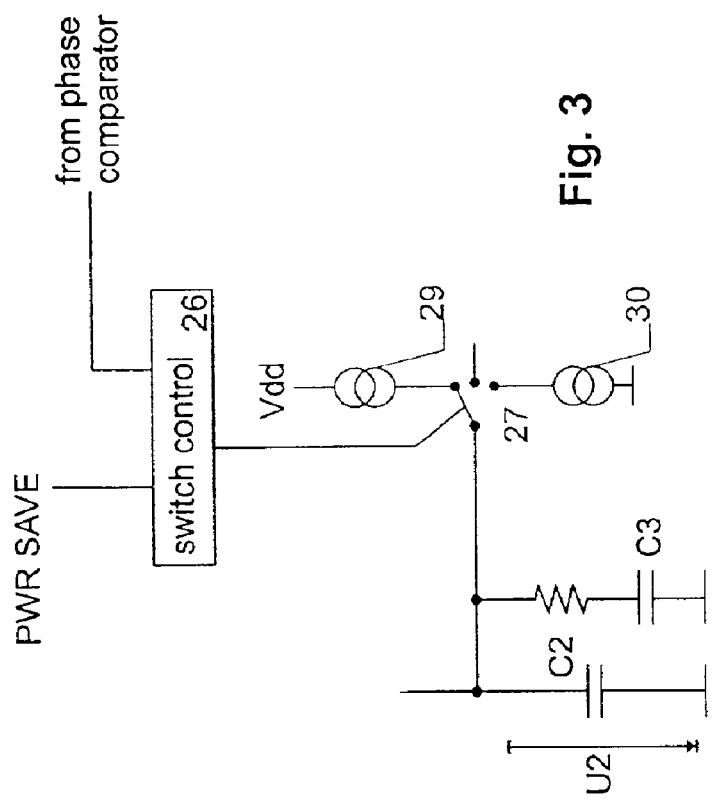
FIG. 3 part of the PLL circuit.

The design of the part of the PLL that drives capacitors C2, C3 is shown in FIG. 3. It comprises a switch control unit 26 controlling a switch 27. In a first state, switch 27 connects capacitors C2, C3 via a current source 29 to the positive supply voltage Vdd. In a second state, switch 27 connects capacitors C2, C3 via a current source 30 to the negative supply voltage or ground. In a third state, switch 27 is in high impedance state. If the comparator finds that the VCO's frequency is too low, switch 27 is primarily set to its first state, thereby increasing voltage U2 over the capacitors, while, if the VCO's frequency is too high and for decreasing voltage U2, switch 27 is primarily in its second state.

The circuit of FIG. 1 comprises a control or power save unit 15. The purpose of this power save unit is to temporarily switch off the circuits of the RF receiver for conservation of power. The position and length of the switch-off periods can e.g. be selected according to a known temporal structure of the incoming signal or according to requirements of the user of the RF receiver.

Power save unit 15 switches off power supply to mixers 4, 6, amplifiers 2, 8, ADC 9 and AGC 10, as well as to the PLL (comparator 12, VCO 14 and frequency dividers) by issuing a control signal PWR SAVE. Typical power-off periods may e.g. have a duration between 1 ms and several seconds.

After a power-off period, power to the circuits of the RF receiver is switched back on and the RF receiver should become operational quickly. Without special provisions, the start-up time of the receiver would be limited by the time it takes for the circuit to re-establish its dynamic settings. These settings are the amplification of adjustable amplifier 8 as well as the frequency of the PLL. To reduce the start-up time, the circuit of FIG. 1 is designed to store these settings as control voltages U1, U2 over the capacitors C1 and C2 or C3. While power is off, the load impedance offered by the circuits to these capacitors is high enough to make the discharge time of the capacitors much longer than a typical power-off period. A typical power-off period is e.g. limited by a few seconds, while the discharge time is e.g. 100 times as large.

It must be noted that the capacitors C1, C2 and C3 serve two purposes. First they act as low pass filters or integraters in their corresponding feed-back loops (ACG and PLL), second they store the setting of the loop during power-off.

To achieve high discharge times, switches 21 and 27 are both set to their third, high impedance state while the signal PWR SAVE indicates that the circuit is switched off.

To reach even higher discharge times, the capacities of the capacitors can be increased where possible. In addition or alternatively to this, active hold circuits can be used to maintain the voltage of the capacitors during power-off periods. In such a circuit, the storage capacitor can e.g. be arranged in the negative feedback loop between the amplifier output and its inverting input.

The LNA 2, the frequency mixers 4, 6, the filters 5, 7, the amplifier 8 and the AGC 10 form the analogue section of the receiver of FIG. 1. In the shown embodiment, the settings of this section are stored during power-off periods by saving the control voltages for the amplifier 8 and the VCO.

By storing the control voltages in the capacitors, the circuit can be switched back on quickly because its settings are maintained.

The principle described here can be used in other electronic circuits having settings that can be controlled by control voltages. In such circuits, the control voltages can be stored in suitable capacitors while power is shut down. The technique shown here is especially suited for PLL circuits in any application or for storing the amplification setting or setpoint of an adjustable RF or LF amplifier. It can also be used for storing the settings of any feedback loops.

In the embodiment described above, power save unit 15 is controlled automatically, i.e. the time and duration of the switch-off periods are not directly determined by the user. However, power save unit 15 could also be controlled by the user directly.

While there are shown and described presently preferred embodiments of the invention, it is to be distinctly understood that the invention is not limited thereto but may be otherwise variously embodied and practised within the scope of the following claims.

What is claimed is:

1. A radio frequency receiver comprising an amplifier, wherein an amplification factor of the amplifier is controlled by the control voltage,
   a control unit for switching off the amplifier during power-off periods, and
   a storage for storing the control voltage while the amplifier is switched off,
   wherein the storage comprises a storage capacitor storing the control voltage.

2. The receiver of claim 1 wherein the storage comprises an electronic switch for disconnecting the capacitor from at least part of the amplifier while the amplifier is switched off.

3. The receiver of claim 1 wherein the storage comprises a hold circuit for actively maintaining the voltage over the capacitor while the amplifier is switched off.

4. The receiver of claim 1 wherein the control unit is adapted to switch off the amplifier for a typical time period, wherein, during switch-off, a discharge time of the capacitor is much larger than the typical time period.

5. The receiver of claim 1 wherein the capacitor is part of a low pass filter in a feed-back loop.

6. The receiver of any one of the preceding claims comprising an analogue section for selectively receiving and amplifying a radio signal of a given frequency, wherein the control voltage controls a setting of said analogue section.

7. The receiver of claim 6 comprising a frequency downconverter for downconverting an incoming signal to an intermediate frequency and an oscillator circuit being connected to the downconverter, wherein a frequency of the oscillator circuit is being controlled by the control voltage and wherein the oscillator is being switched on and off by the control unit.

8. The receiver of claim 7 wherein the oscillator circuit comprises a voltage controlled oscillator in a phase locked loop, wherein the frequency of the voltage controlled oscillator is being controlled by the control voltage.

9. The receiver of claim 6 wherein said control voltage is adjusted to hold an average signal strength at a desired value.

10. The receiver of claim 1 wherein the control unit switches the circuit elements on and off according to a temporal structure of a received and transmitted radio signal.

11. A radio frequency receiver comprising
   a frequency downconverter for downconverting an incoming signal to an intermediate frequency,
   an oscillator circuit being connected to the downconverter, a frequency of said oscillator being controlled by a control voltage,
   a control unit for switching off the oscillator during power-off periods, and
   a capacitor for storing the control voltage while the oscillator is switched off.

12. The radio frequency receiver of claim 11 wherein the oscillator is arranged in a phase locked loop.

13. A radio receiver comprising:.
   at least one phase locked loop with a voltage controlled oscillator to deliver a local oscillator signal having a frequency controlled by a control voltage;
   a mixing device to mix a received radio signal with said local oscillator signal and to generate a downconverted signal;
   a power save unit to switch off said voltage controlled oscillator during power-off periods; and
   a storage capacitor to store said control voltage.

14. The radio receiver of claim 13 further comprising a switch to disconnect said storage capacitor from at least part of said radio receiver during power-off periods.

15. The radio receiver of claim 13 further comprising a hold circuit to actively maintain the voltage over said capacitor during power-off periods.

16. The radio receiver of claim 13 wherein the discharge time of said capacitor during said power-off periods is much longer than a typical power-off period.

17. The radio receiver of claim 13 wherein said capacitor is part of a low-pass filter in a PLL feedback loop.

18. A radio receiver, comprising:
   an automatic gain control (AGC) circuit to generate a control voltage;
   a variable gain amplifier, wherein an amplification factor of the variable gain amplifier is based on the control voltage;
   a power save unit for switching off said AGC circuit during power-off periods, and
   a storage capacitor to store said control voltage.

19. The radio receiver of claim 18 further comprising a switch for disconnecting said storage capacitor from at least part of said radio receiver during power-off periods.

20. The radio receiver of claim 18 further comprising a hold circuit for actively maintaining the voltage over said capacitor during power-off periods.

21. The radio receiver of claim 18 wherein the discharge time of said capacitor during said power-off periods is much longer than a typical power-off period.

22. The radio receiver of claim 18 wherein said capacitor is part of a low-pass filter of said AGC circuit.

23. The radio receiver of claim 18 wherein said AGC circuit comprises a buffer having an input coupled to the capacitor and an output coupled to the variable gain amplifier.

* * * * *

UNITED STATES PATENT AND TRADEMARK OFFICE
CERTIFICATE OF CORRECTION

| | | |
|---|---|---|
| PATENT NO. | : 6,968,220 B2 | Page 1 of 1 |
| APPLICATION NO. | : 09/973,593 | |
| DATED | : November 22, 2005 | |
| INVENTOR(S) | : Francesco Piazzi | |

It is certified that error appears in the above-identified patent and that said Letters Patent is hereby corrected as shown below:

Title page,
    After the section "Primary Examiner - Binh K. Tieu," --(74) Attorney, Agent, Firm-Marshall, Gerstein & Borun LLP--.

Signed and Sealed this

Eighteenth Day of July, 2006

JON W. DUDAS
*Director of the United States Patent and Trademark Office*